United States Patent
Young et al.

(10) Patent No.: US 9,152,738 B2
(45) Date of Patent: Oct. 6, 2015

(54) SORTABLE AND UPDATEABLE COMPILATION AND ARCHIVING PLATFORM AND USES THEREOF

(76) Inventors: Neil Young, Santa Monica, CA (US); Larry Johnson, Los Angeles, CA (US)

( * ) Notice: Subject to any disclaimer, the term of this patent is extended or adjusted under 35 U.S.C. 154(b) by 210 days.

(21) Appl. No.: 12/483,881

(22) Filed: Jun. 12, 2009

(65) Prior Publication Data

US 2009/0313251 A1    Dec. 17, 2009

Related U.S. Application Data

(60) Provisional application No. 61/061,298, filed on Jun. 13, 2008.

(51) Int. Cl.
*G06F 7/00* (2006.01)
*G06F 17/30* (2006.01)

(52) U.S. Cl.
CPC .............. *G06F 17/30997* (2013.01)

(58) Field of Classification Search
CPC .......... G06F 17/30017; G06F 17/3002; G06F 17/30023; G06F 17/30038; G06F 17/30041; G06F 17/30044; G06F 17/30047
USPC ................. 707/705, 736, 737, 740, 748, 752, 707/999.1, 722, 725
See application file for complete search history.

(56) References Cited

U.S. PATENT DOCUMENTS

| | | | |
|---|---|---|---|
| 6,460,047 B1 | 10/2002 | Ambroziak | |
| 2003/0187964 A1* | 10/2003 | Sage et al. | 709/221 |
| 2004/0143598 A1* | 7/2004 | Drucker et al. | 707/104.1 |
| 2004/0252604 A1* | 12/2004 | Johnson et al. | 369/47.22 |
| 2005/0289133 A1 | 12/2005 | Arrouye et al. | |
| 2006/0034326 A1* | 2/2006 | Anderson et al. | 370/466 |
| 2006/0218195 A1* | 9/2006 | LaChapelle et al. | 707/104.1 |
| 2006/0280497 A1* | 12/2006 | Wakabayashi | 396/287 |
| 2007/0117083 A1* | 5/2007 | Winneg et al. | 434/350 |
| 2007/0136286 A1 | 6/2007 | Webster | |
| 2007/0193437 A1* | 8/2007 | Kong et al. | 84/610 |
| 2008/0155458 A1* | 6/2008 | Fagans et al. | 715/781 |
| 2008/0235248 A1* | 9/2008 | Krantz et al. | 707/100 |
| 2008/0313214 A1* | 12/2008 | Duhig et al. | 707/102 |

FOREIGN PATENT DOCUMENTS

TW    200817947 A    4/2008

OTHER PUBLICATIONS

International Search Report and Written Opinion for International App. No. PCT/US2009/047243, mailed Aug. 24, 2009, 10 pages.

* cited by examiner

*Primary Examiner* — Hares Jami
(74) *Attorney, Agent, or Firm* — Buchalter Nemer (57) ABSTRACT

A compilation and archiving platform is disclosed that includes at least one piece of information, wherein each piece of information comprises at least one tag and wherein the at least one piece of information is organized in a predetermined logical order in the platform. Methods of forming a compilation platform are also disclosed that include: a) providing at least one piece of information, wherein each piece of information comprises at least one tag; and organizing the at least one piece of information into a predetermined logical order in the platform.

18 Claims, 7 Drawing Sheets

SORTABLE AND UPDATEABLE COMPILATION AND ARCHIVING PLATFORM AND USES THEREOF

This application is a United States Utility application that claims priority to U.S. Provisional Application Ser. No. 61/061,298 filed on Jun. 13, 2008, which is incorporated herein in its entirety by reference.

FIELD OF THE SUBJECT MATTER

The field of the subject matter is a sortable and updateable archiving platform and uses thereof.

BACKGROUND

Consumers have been looking for ways to get the entire history of a favorite musician, author, artist, event or family for as long as there have been methods to collect that information. Unfortunately, there have not been any simple or straightforward methods or platforms available to label, archive, sort, search and present all of that information in one format. In addition, when new information—whether contemporary or historic—is introduced on a particular subject, it is practically impossible to archive that information intelligently into the collection without reorganizing the collection manually.

For example, dedicated fans of an musician may spend the better part of several decades, along with a great deal of money, collecting everything by or about that musician, including recordings, articles, ticket stubs, programs, posters, books, letters, interviews, notes and anything else that artist may have produced. Although these consumers may still be willing to spend the same amount of money to acquire all of these items, it is clear that many consumers would like to consolidate all of these items into a compact and easily reviewable space. An example of this point may be a collection of vinyl recordings. While these recordings may be the preferred recording for many music lovers—these vinyl recordings are susceptible to damage or destruction by heat, children, pets or poor audio equipment.

One of the methods of presenting information on a television channel, such as the History Channel, is to present a documentary on a particular topic—say, the War of 1812—and then present additional information on the Internet at HistoryChannel.com, such as letters from soldiers, timelines, electronic texts of history books and scholarly articles on the War of 1812. While this process is certainly one way of providing different types of information on a topic—it still does not solve the problem of providing intelligently sorted new information to an interested consumer.

In another example, a family either compiles or pays for another entity to compile a history of the family whether it's in family tree form or another form. Regardless of the method of compilation, the "compilee" is missing information—whether it's information from the family or information found outside of the family's knowledge. Therefore, it is easy to comprehend that a family history may be initially prepared and include certain information, but a true family history is prepared by including letters from family members, stories that are told on video and in writing, photos, videos and documents. In addition, when a new family member or members are discovered or born, it is not easy to incorporate that additional information into an already existing family history without significantly reorganizing the entire collection of information. Also, as technology advances, it may be difficult to migrate that information to new formats without losing information.

These examples, along with countless others, show that there is still a need for a method and platform for intelligently organizing and archiving the information at hand, while at the same time allowing the flexibility of incorporating new information as it comes available. In addition, consumers with these "ultimate collections" should have the ability to be notified as this information becomes available, so that they may decide whether to add it to the collection where it will be intelligently sorted and archived in relation to everything else in the collection.

SUMMARY OF THE SUBJECT MATTER

A compilation and archiving platform is disclosed that includes at least one piece of information, wherein each piece of information comprises at least one tag and wherein the at least one piece of information is organized in a predetermined logical order in the platform.

Methods of forming a compilation platform are also disclosed that include: a) providing at least one piece of information, wherein each piece of information comprises at least one tag; and organizing the at least one piece of information into a predetermined logical order in the platform.

DETAILED DESCRIPTION

Surprisingly, such an extensive platform for intelligently labeling, sorting, archiving and updating information, while at the same time allowing all of that information to be searchable and contained within one format has been developed and will provide an entirely new entertainment and information experience for consumers. Another novel feature of contemplated compilation and archiving platforms and systems disclosed herein is the fact that the original information and any new pieces of information can be intelligently, logically and automatically sorted by and on the platform without any significant work on the part of the user/listener.

A compilation and archiving platform is disclosed that includes at least one piece of information, wherein each piece of information comprises at least one tag and wherein the at least one piece of information is organized in a predetermined logical order in the platform. Methods of forming a compilation platform are also disclosed that include: a) providing at least one piece of information, wherein each piece of information comprises at least one tag; and organizing the at least one piece of information into a predetermined logical order in the platform.

A new piece of information that is identified as part of a collection is converted into electronic form and labeled or tagged by any suitable tagging format or process, such as an electronic tag, a digital tag or a combination thereof. The process of labeling the information may include tagging the information with any suitable tag, including a date or date range, along with a subject matter identifier, author identifier, producer identifier or any other suitable identifier that allows the information to be automatically sorted and archived in an existing compilation of information. Contemplated tags comprise at least one identifier, wherein the identifier comprises any suitable information, including date information, time information, author information, artist information or a combination thereof.

Once a new piece of information is labeled or tagged, it is automatically and intelligently sorted and archived in a predetermined logical order on the platform. The predetermined logical order may include ordering the at least one piece of information by time, date, subject matter, author, producer or a combination thereof. It should be understood that the predetermined logical order is the "timeline" upon which the archive collection or compilation is built; and therefore, the information is not presented in a random format. If one wants to reorder the collection based on another label or tag, the compilation will automatically reorder itself such that all of the information is intelligently sorted and archived.

To understand the concept of "a piece of information" it is instructive to use the following example. A contemplated piece of information may comprise one type of data or a plurality of types of data. If someone wants to insert an audio file onto an already existing platform, that audio file is a piece of information and it contains one type of data—audio data, such as a .wav file or a high resolution audio file. If someone gets an electronic alert from the source of the compilation that new content is available for the compilation. The user clicks a button to accept, and possibly pay for, the new content. That new content comes into the system as one piece of information. This new piece of information contains multiple types of data—video files, audio files and pdf documents. All of these types of data are tagged and each file is placed where it should be appropriately placed on the platform/timeline. So, a piece of information may comprise one type of data, at which point the piece of information and the type of data shares the same tag, or the piece of information may comprise multiple types of data wherein the multiple types of data actually have the tags, so that each type of data can be appropriate placed on the compilation platform.

In another example of a contemplated platform or system, a plurality of songs is each tagged with the original date of production, the artist, the producer and the album. A plurality of lyrics is each tagged with the original date of creation, the artist and the album. The original compilation is laid out in a timeline order based on date of production or creation. Ten new songs that have already been individually tagged with the original date of production, the artist, the producer and the album are purchased by the compilation owner and are automatically incorporated into the original timeline as to the timeline's original predetermined logical order—by date. Later, the owner of the compilation wants to reorder the compilation based on another tag—the artist. The owner resets the logical order to sort the compilation based on the artist—and the compilation automatically reorders itself appropriately. All of the information is automatically and intelligently sorted, such that the compilation is viewed by order of artist, with very few clicks or commands by the owner.

Once the information is labeled, it is submitted either to the consumer or the compilation directly. If it is submitted to the consumer, the information is then fed automatically to the compilation upon receipt. The piece of information enters the platform of the compilation, is electronically reviewed, is sorted according to the labels associated with the information and archived intelligently and logically into the compilation. One piece of information may be associated with several aspects of the compilation, and that information is reflected in the initial label given to that piece of information. Labels or tags on the information already within the compilation can be updated as needed in order to reflect new features associated with the compilation.

Contemplated archiving platforms may be stored and utilized on any format that allows for readability and intelligent writeability. One contemporary format is Blu-Ray™ format, which is organized using Java™ code format by Sun Microsystems. Other suitable formats include .NET Framework by Microsoft, Mozilla Prism XUL and XUL Runner or Adobe Air, among others. However, as new formats are developed, this technology should be able to migrate easily onto those formats, as long as the new format allows for the intelligent labeling, sorting, archiving, updating and searching of information. One novel feature to this archiving platform is the introduction of the ability to listen to music in high resolution and high resolution format as the user reviews information in the compilation. Contemplated compilation and archiving platforms may be stored on or in any suitable portable media. Contemplated portable media comprises a computer hard drive, a laptop computer, a hand held device, an iPod, a MP3 player, the Internet or a combination thereof.

EXAMPLES

Example 1

Neil Young Archives Project

As mentioned, a contemplated platform organizes historic information in a way that makes it easy for users to hear music and simultaneously cruise through a timeline of events while drawing on a massive file cabinet to access information in several different ways, resulting in a new way to listen to music/media or study history.

One aspect of this collection is shown in the Figures as described herein. This portion of the Neil Young collection covers several years of his life by including music, letters, posters and ticket stubs, lyrics, live performances, notes, interviews and photos. As new content is developed and/or found that covers this period in Neil Young's life, owners of the collection will get notification, such as by E-mail, indicating that new content is ready to be added to the collection. Once the user confirms that the new content is to be added to the collection, the content will be identified, sorted and dropped into the timeline of Neil Young's life, as presented in the collection.

One example of how this platform functions for the Neil Young archives is that a member of Neil Young's family finds some notes and lyrics drafts for the song "Ohio"—a song about the student shootings at Kent State University in 1970. In addition, several Kent State students from 1970 find photos, diary entries and poetry relating to this same period of time and submit them to Neil Young. All of these items can be converted into electronic format, labeled and dropped into the timeline, along with the studio and live recordings of the song in high resolution format, the final lyrics and a video of a live performance of the song in Los Angeles. People who purchased the Neil Young Archives for this period will get a notification of this additional content and will be able to add it directly to their compilation. This kind of insight into an artist, the time and history when he created his music and the dynamic performances could never before be put into a format that is sortable, archivable and updateable.

Figure 1:
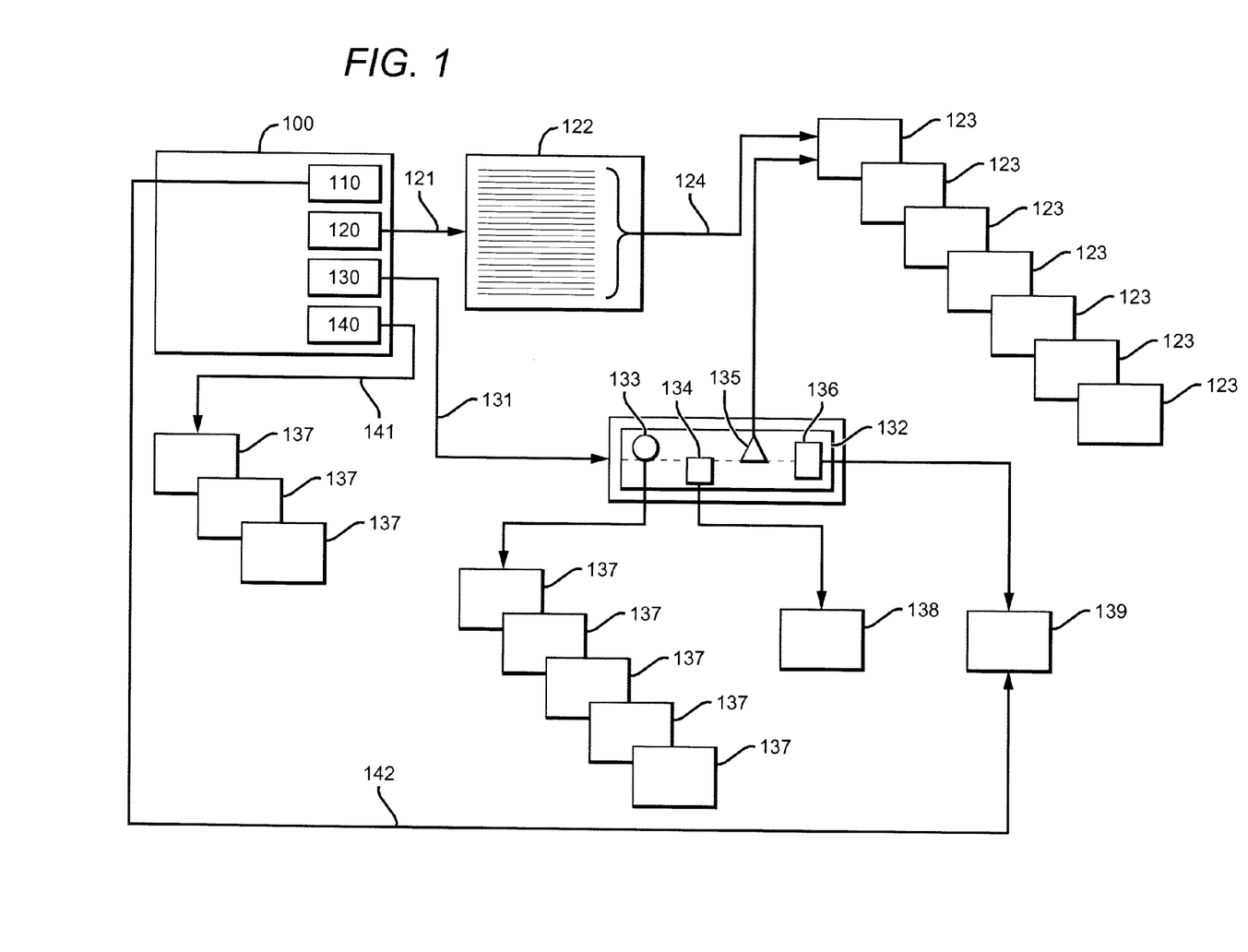
FIG. 1 shows an overview of a contemplated compilation and archiving platform for Neil Young archives.

FIG. 1 shows an overview of a contemplated compilation and archiving platform for Neil Young archives. A contemplated archives platform 100 comprises several tabs 110, 120, 130 and 140 that allow the user to navigate the platform and enjoy all of the information in the archives collection. For example, tab 120 is a "file cabinet" tab that navigates 121 the user to a file cabinet 122 showing all of the songs in the collection. The user can then click 124 on a component of the file cabinet 122 to open up any one of the song files 123 that lists information and content for the user. Tab 130 allows the user to navigate 131 to a main page 132 showing several components of the archives collection (133, 134, 135 and 136) that lead to other breakout sections of the archives collection. Tab 133, for example, allows the user to navigate to a series of videos 137. Tab 134 allows the user to navigate to related internet content 138. Tab 135 takes the user to the set of songs and song files 123. Tab 136 takes the user to a timeline 139 where the user can sort through content based on at least one identifier, such as date information, time information, author information artist information or a combination thereof. Tab 140 allows the user to navigate 141 straight to the videos 137. Tab 110 allows the user to navigate 142 right to the timeline 139.

Figure 2:
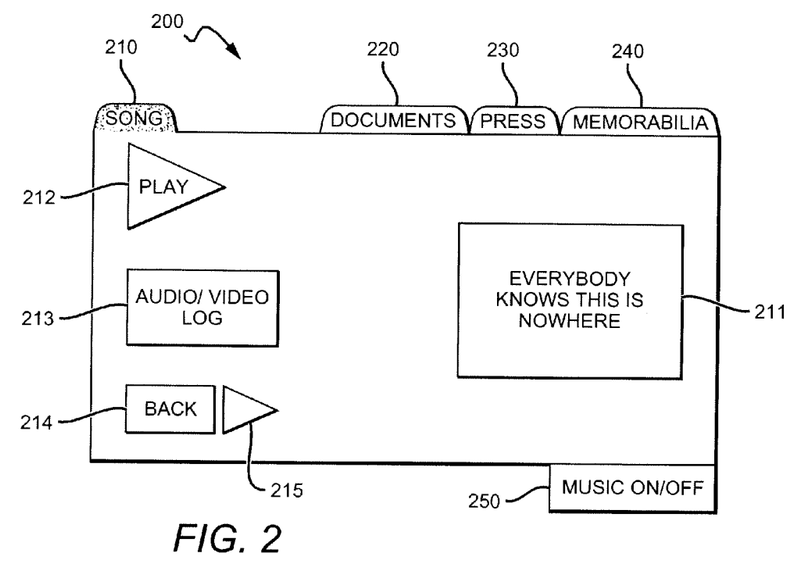
FIG. 2 shows a contemplated close-up view 200 of one of the song files 123 from FIG. 1.

FIG. 2 shows a close-up view 200 of one of the song files 123 from FIG. 1. In this close-up view 200, there are four original tabs 210, 220, 230 and 240. The original view 210 is the "song" view that lets the user see the navigation areas on this close-up view 200. The "song" view 210 in this contemplated embodiment, shows the title of the song 211, a play button 212 where the user can play the song, an "audio/video log" 213 where the user can listen to and/or watch videos of the song in studio and live recordings, a "back" button 214 where the user can navigate back to the last screen and a "forward" tab 215 where the user can navigate to the next screen in the system. There's also a "music on/off" tab 250 where the user may turn on or off the streaming music that plays during this particular archives collection. Tab 220 leads the user to a "documents" page related to the song "Everybody Knows This Is Nowhere" where documents related to the song are displayed for view and review. Tab 230 leads the user to a "press" page related to the song where press clippings, press releases and press interviews are displayed and available for view and review. Tab 240 leads the user to a "memorabilia" page related to the song where other items are stored for review by the user.

Figure 3:
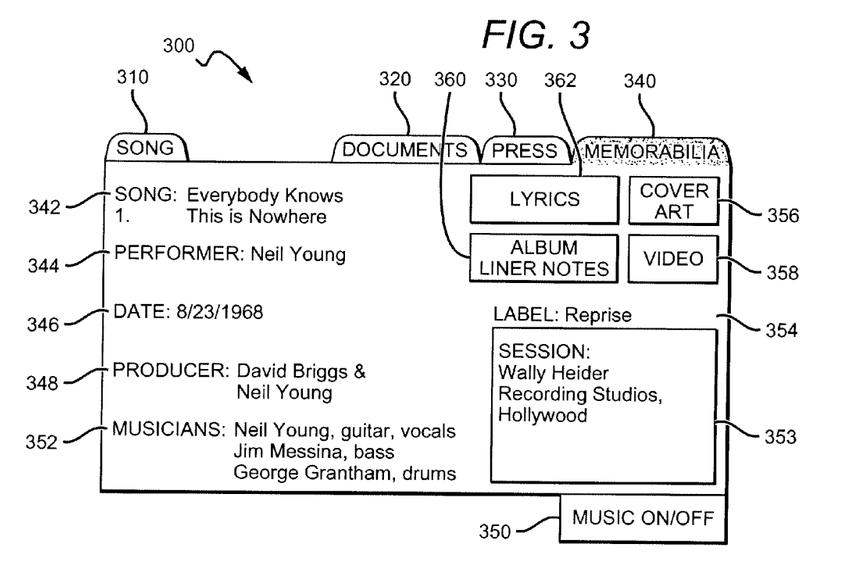
FIG. 3 shows a contemplated close-up view 300 of one of the song files 123 from FIG. 1.

FIG. 3 shows a close-up view 300 of one of the song files 123 from FIG. 1. In this close-up view 300, there are four original tabs 310, 320, 330 and 340. In this Figure, the "memorabilia" tab 340 is highlighted. On the memorabilia tab 340, there are several pieces of information, including the "song" 342, the "performer" 344, the "date" 346, the "producer" 348, the "musicians" 352, the "label" 354 and the "session" 353. There are also four tabs that the user can use to navigate additional pieces of information—the "lyrics" tab 362 where a user can go and look at the lyrics and notes related to the lyrics, the "cover art" tab 356 where a user can look at the cover art for the single and album where the song appeared. There may also be information related to the artist who produced the cover art, the process for choosing the cover art and the inspiration for the cover art. There is also a "video" tab 358 where there may be additional videos related to the song by Neil Young, his band, his friends and other people associated with the song or inspired by the song. Tab 350 is also included on this page—as with all pages—where the user can turn the music on or off.

Figure 4:
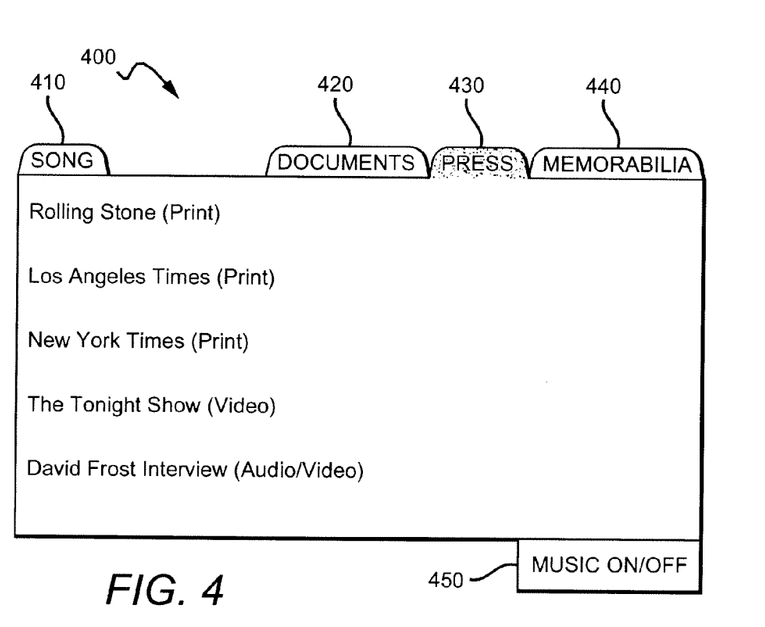
FIG. 4 shows a contemplated close-up view 400 of one of the song files 123 from FIG. 1.

FIG. 4 shows a close-up view 400 of one of the song files 123 from FIG. 1. In this close-up view 400, there are four original tabs 410, 420, 430 and 440. In this Figure, the "press" tab 430 is highlighted. On the press tab 430, there are several pieces of information, including print reviews from Rolling Stone Magazine, the Los Angeles Times and the New York Times. There is also a video interview of Neil Young from The Tonight Show. Finally, there is an audio and video interview from Neil Young with David Frost. Tab 450 is also included on this page—as with all pages—where the user can turn the music on or off.

Figure 5:
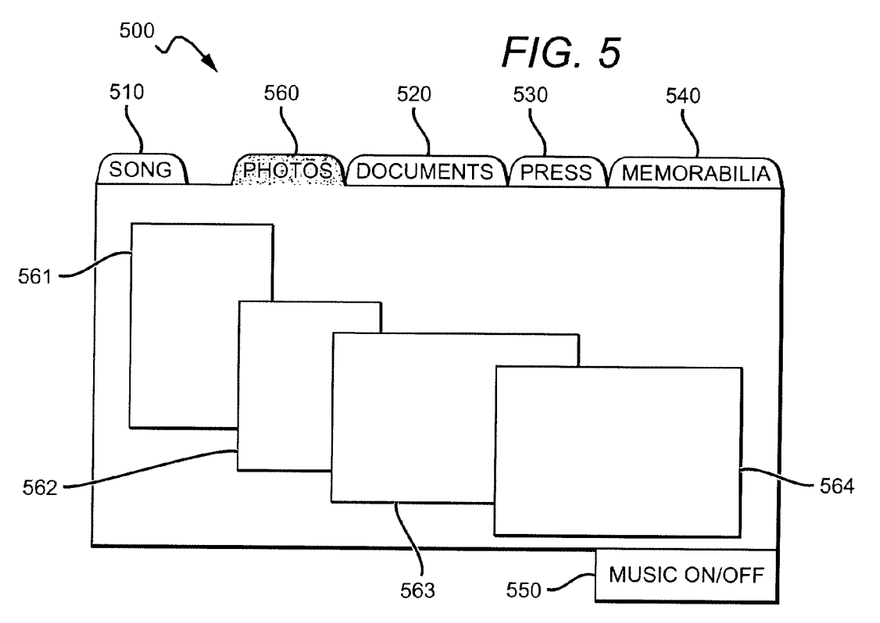
FIG. 5 shows a contemplated original song page with the additional "photo" tab 560, along with the original tabs 510, 520, 530 and 540.

After the user purchases the initial archives collection, the user subscribes to the Neil Young Compilation Project—a place where the user can register her archives collection and get more content. Three months after the user registers her archives collection, Neil Young adds some photos from the session where "Everybody Knows This Is Nowhere" was first records, photos from the tour where the song was debuted and other related photos. FIG. 5 shows the original song page with the additional "photo" tab 560, along with the original tabs 510, 520, 530 and 540. Photos 561, 562, 563 and 564 are shown on the page where the user can navigate around and see each photo. Tab 550 is also included on this page—as with all pages—where the user can turn the music on or off.

Figure 6:
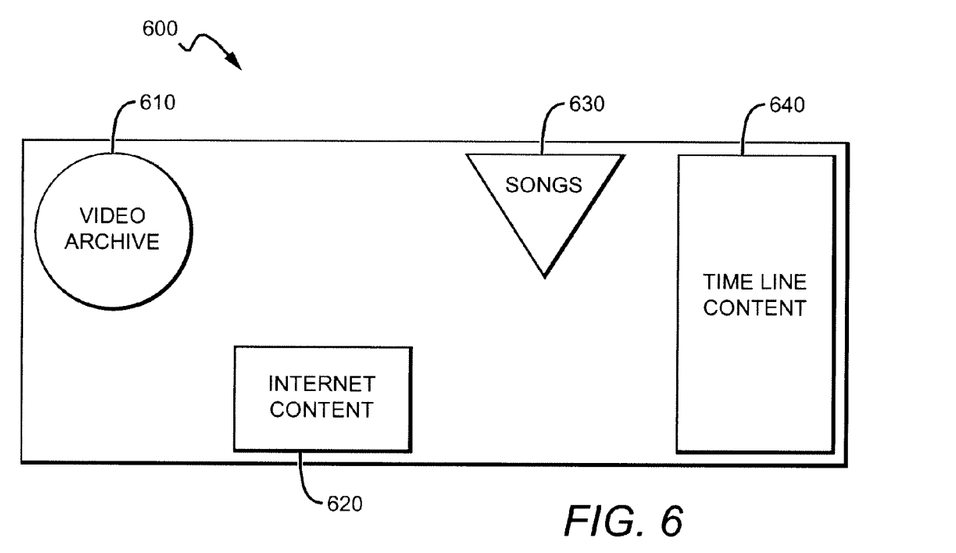
FIG. 6 shows another navigation point on FIG. 1—a contemplated main page 132) which is labeled as 600 for this Figure.

FIG. 6 shows another navigation point on FIG. 1—the main page 132, which is labeled as 600 for this Figure. Four areas that the user can navigate are presented—the "video archive" 610 that pulls all of the videos for the archives collection together, the "internet content" 620 where the user is taken outside of the collection to current internet content, the "songs" 630 where the user is taken back to the collection of songs—shown as 123 in FIG. 1, and the "timeline content" 640 takes the user over to the timeline that presents the pieces of information in the archives collection in timeline form according to the identifiers used.

Figure 7:
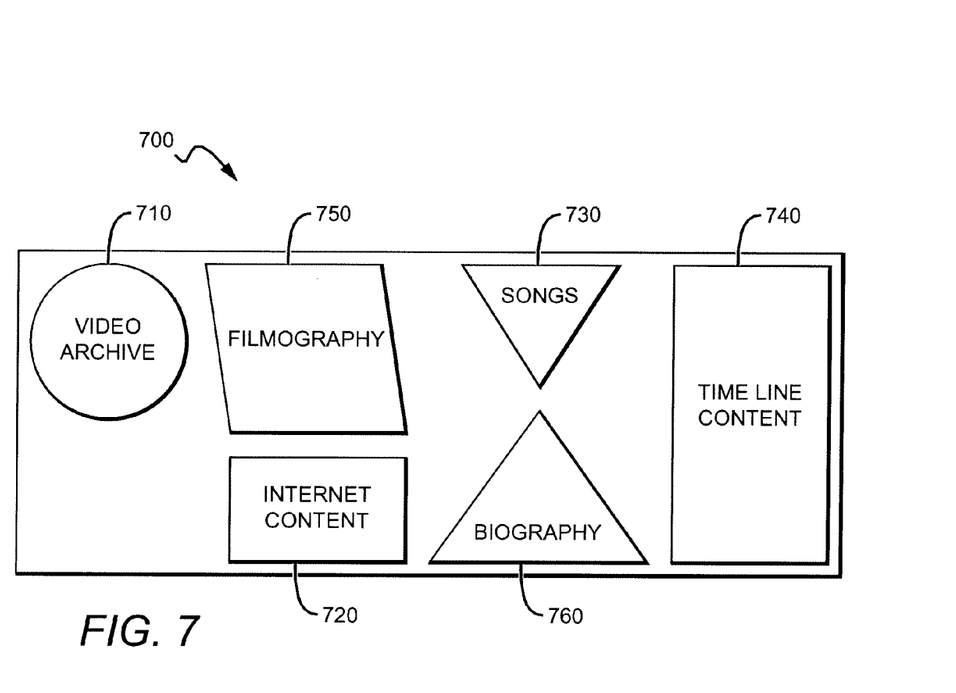
FIG. 7 shows a contemplated main page 600 from FIG. 6, which is labeled as 700 for this Figure.

FIG. 7 shows the main page 600 from FIG. 6, which is labeled as 700 for this Figure. Four areas that the user can navigate are presented—the "video archive" 710 that pulls all of the videos for the archives collection together, the "internet content" 720 where the user is taken outside of the collection to current internet content, the "songs" 730 where the user is taken back to the collection of songs—shown as 123 in FIG. 1, and the "timeline content" 740 takes the user over to the timeline that presents the pieces of information in the archives collection in timeline form according to the identifiers used. However, in this updated version, the user has registered her archives collection and additional content has been pushed out after registering, including a "filmography" 750 tab that includes a documentary about the Sugar Mountain recording and film footage from a CSNY tour, and a "biography" 760 tab that holds an audio book recording of a Neil Young biography that has just been released, along with an Adobe PDF copy of the book.

Figure 8:
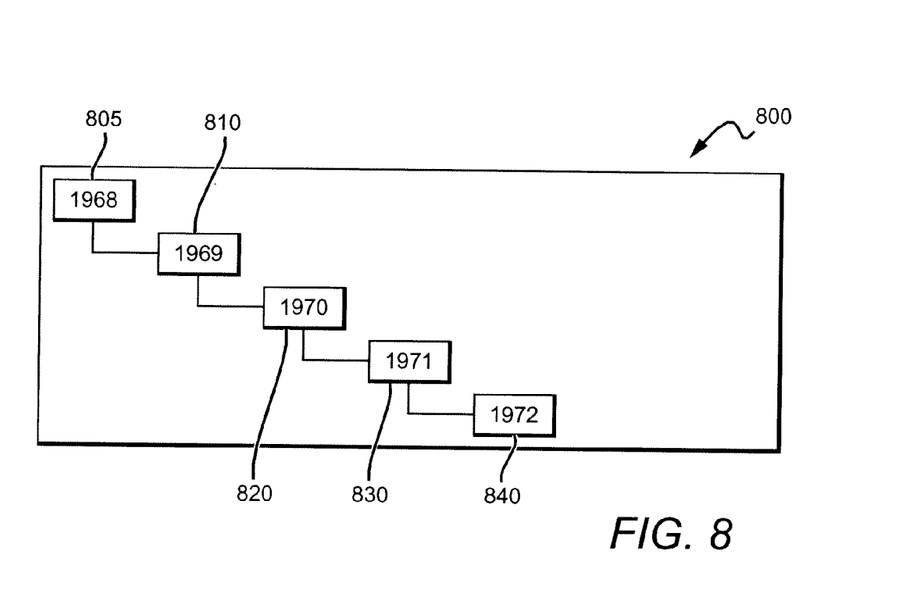
FIG. 8 shows a contemplated timeline 800 portion of the archives, which was represented as tab 139 in FIG. 1.

FIG. 8 shows the timeline 800 portion of the archives, which was represented as tab 139 in FIG. 1. This particular timeline is formatted using date information as the identifier. So, in this timeline, each year 805, 810, 820, 830 and 840 is presented as a tab that the user can click on and navigate to pages that contain information related to each year. For example, the songs are presented in the File Cabinet (122 in FIG. 1), but may be presented in the timeline under the appropriate year tab.

Figure 9:
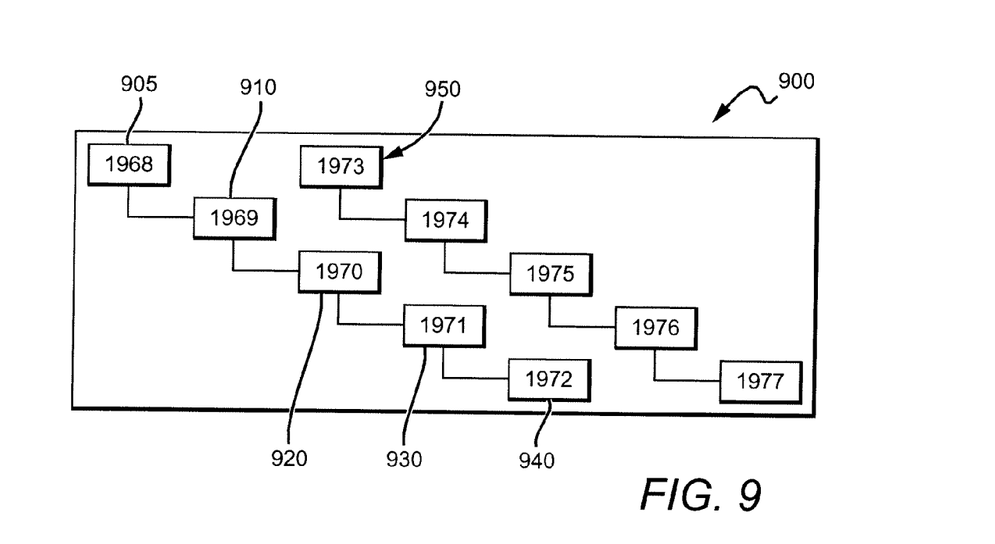
FIG. 9 shows a contemplated timeline 900 portion of the archives, which was represented as tab 139 in FIG. 1 and timeline 800 in FIG. 8.

FIG. 9 shows the timeline 900 portion of the archives, which was represented as tab 139 in FIG. 1 and timeline 800 in FIG. 8. This particular timeline is formatted using date information as the identifier. So, in this timeline, each year 905, 910, 920, 930 and 940 is presented as a tab that the user can click on and navigate to pages that contain information related to each year. For example, the songs are presented in the File Cabinet (122 in FIG. 1), but may be presented in the timeline under the appropriate year tab. However, in this updated version, the user has registered her archives collection and additional content has been pushed out after registering, including five (5) additional years 950 from 1973 to 1977.

Example 2

American History Project

David Halberstam, who drafted the preeminent novel on the start of the Vietnam war, puts together an electronic compilation to mark the 25th Anniversary of his book—"The Best and The Brightest". Along with having notes and research from the time when he was writing the book, he has put together the original Harper's magazine article, documentaries, Kennedy family letters, critiques, documents released from Freedom of Information Act (FOIA) requests and interviews of contemporaries who were in the White House during this time in American History. The first release of this compilation contains all of this information in a searchable archives including an audio reading of his book by the author. Five years later, additional documents are released via FOIA, along with White House audio tapes from that time period and new interviews with soldiers from the war. The compilation project also strikes a deal with several key artists of that time period, including Bob Dylan, members of Credence Clearwater Revival, The Animals, Buffalo Springfield, The Doors, The Rolling Stones and the estate of John Lennon who agree to provide several of their relevant songs as background music to some parts of the compilation. These songs can be labeled and archived with letters and documents that relate to the lyrics of those songs.

Example 3

Family History Project

The Poteat family from western North Carolina spends five years putting together information about their family history, including obtaining genealogy information from a company who specializes in obtaining that information, interviewing the matriarch of the family, who is 90 years old, along all of the known children, grandchildren and great grandchildren, gathering photos, letters and birth certificates from family members. Information is found relating to members of the family who were Cherokee Indians. This information is in the form of photos, letters and information found at the Historical Society of North Carolina, Architectural plans, letters, photos and information related to Poteat Hall at Wake Forest University is found. All of this information is converted into electronic format, labeled, sorted and archived. Two years later, a new baby is born into the family. Photos, a birth certificate and video of the new baby is labeled and archived into the timeline. Also, family members from Virginia are located having their own history Both family histories can be merged together, sorted, archived and pushed out to all of the family members in Blu-Ray format. The family members would have the most current history of their family, as new information is put into the collection, without having to manually sort that information on their own.

One member of the family marries someone who also has a family history compilation—the Thompson family history compilation. After marriage, the two family histories can be merged together, intelligently and automatically sorted such that the two family histories are laid out logically on the same timeline. The users do not need to manually sort through and layout the information on their own. These "virtual scrapbooks" are easy to compile, merge and update easily by any member of the family. The family histories can also be merged into a bigger project—such as one by the North Carolina History Museum or North Carolina Historical Society—where many different family histories from one area or one background can be easily merged, reviewed and compared.

Example 4

Graduate Student Dissertation Project

A graduate student in Analytical chemistry at the University of California—Irvine is working on a project involving electrical discharges and their use to clean indoor air. This graduate student is gathering data from several instruments, including a gas chromatograph, fiber optic probe, charged coupled device detector and computer modeling. The graduate student also videotapes all of her key experiments in the lab and at remote sites, her contemporaneous thoughts and notes on her project and public speaking engagements on the project. She collects background information from a variety of sources, such as journals, documentaries, EPA reports, patents and interviews of leading scientists in the field. She is able to archive and sort all of this information on the archive platform initially. As new information, videos, articles and experiments come in to her, she can label and intelligently sort the information, wherein the information is placed exactly where it should be on her project timeline. This electronic document is linked exactly where it needs to be linked in the timeline, where it will make sense to her professors and others who are reviewing her work.

This format is very useful to her graduate professor also. Usually, graduate students work in teams on various aspects of the same project. It can be a daunting task to put all of that information together in a way that makes sense, while being able to add to it with future graduate student studies. This type of archive platform facilitates that process by allowing the graduate professor to intelligently sort everyone's contribution into the same timeline—including future work by graduate students not in the graduate program yet or working on the specific project.

Figure 10:
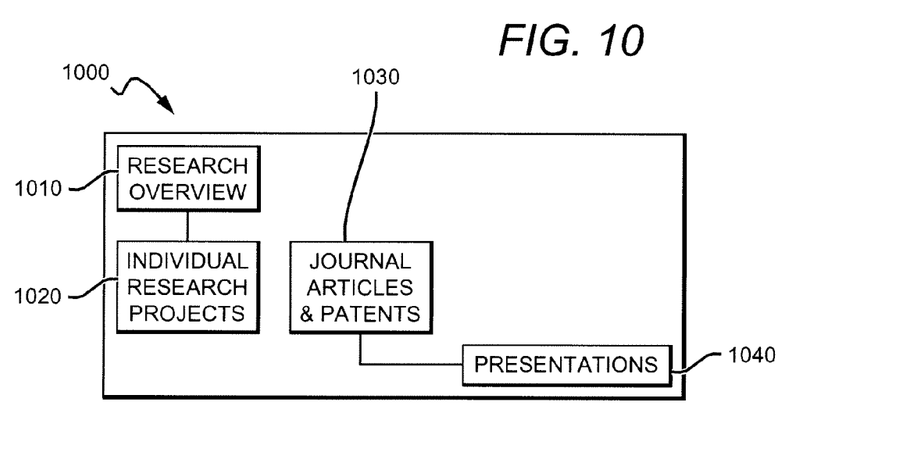
FIG. 10 shows how a contemplated graduate professors overall research summary 1000 may be laid out for review.

FIG. 10 shows how the graduate professors overall research summary 1000 may be laid out for review. The top level "research overview" 1010 provides the initial research request, a "white paper" type of summary for the project that provides an updateable set of results and conclusions about certain aspects of the project, and a data summary prepared after each set of data is merged into the compilation. The "individual research projects" tab 1020 allows the user to navigate through the research results for each individual graduate student working on the project. The "journal articles and patents" tab 1030 allows the user to review all of the journal articles and patents produced as a result of the research on the project. The "presentations" tab 1040 allows the user to navigate through audio, video and documents related to presentations that individual group members have given at national and local scientific meetings, dissertation defenses, poster sessions and other related presentations.

Figure 11:
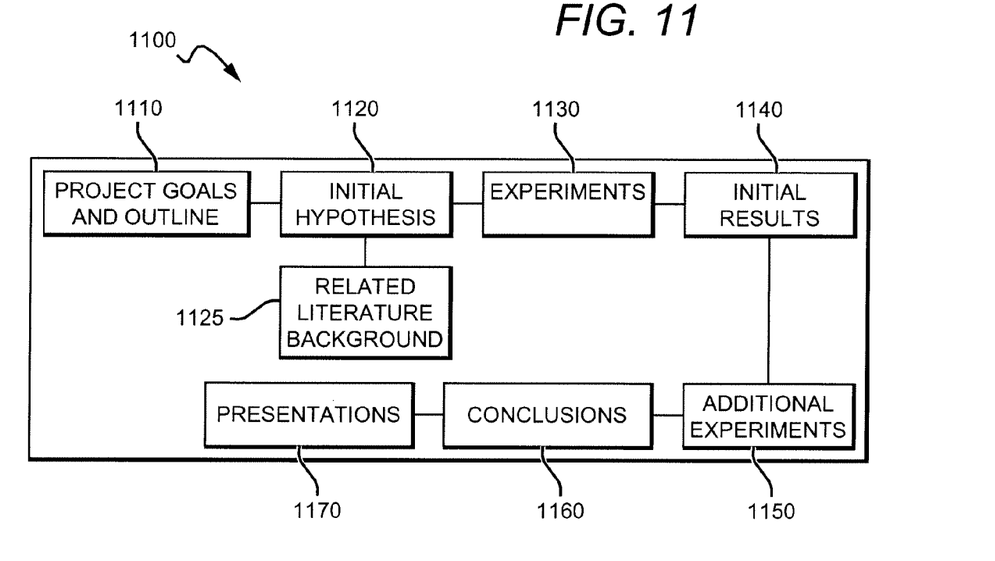
FIG. 11 shows a contemplated "research overview" tab 1010 from FIG. 10, herein shown as 1100.

FIG. 11 shows the "research overview" tab 1010 from FIG. 10, herein shown as 1100. On this view, the user can navigate through tabs to see the top level overview of the project, including the "project goals and outline" 1110, the "initial hypothesis" 1120 information, the "experiments" 1130, the "initial results" 1140, the "additional experiments" 1150 that follow the first set of results, a "conclusions" 1160 tab and a "presentations" 1170 tab. "Related literature and background" information 1125 can be presented as an offshoot of the "initial hypothesis" tab that provides background to how the hypothesis was developed.

Figure 12:
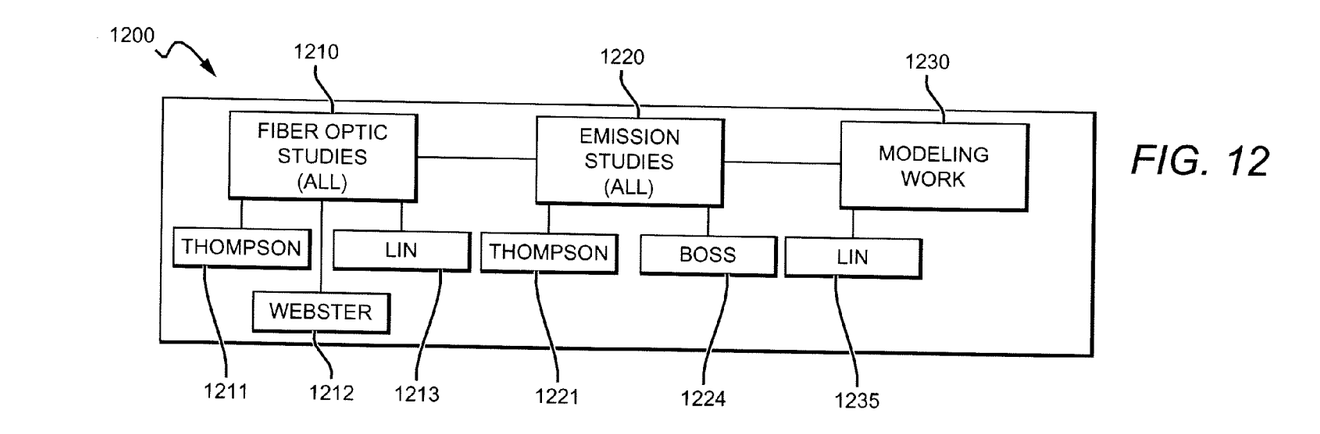
FIG. 12 shows a contemplated "individual research projects" tab 1020 from FIG. 10, herein shown as 1200.

FIG. 12 shows the "individual research projects" tab 1020 from FIG. 10, herein shown as 1200. On this view, the user can navigate through research and data presented by technology (1210, 1220 and 1230) related to the data or by individual (1211, 1212, 1213, 1221, 1224 and 1235) who collected and analyzed the data.

Figure 13:
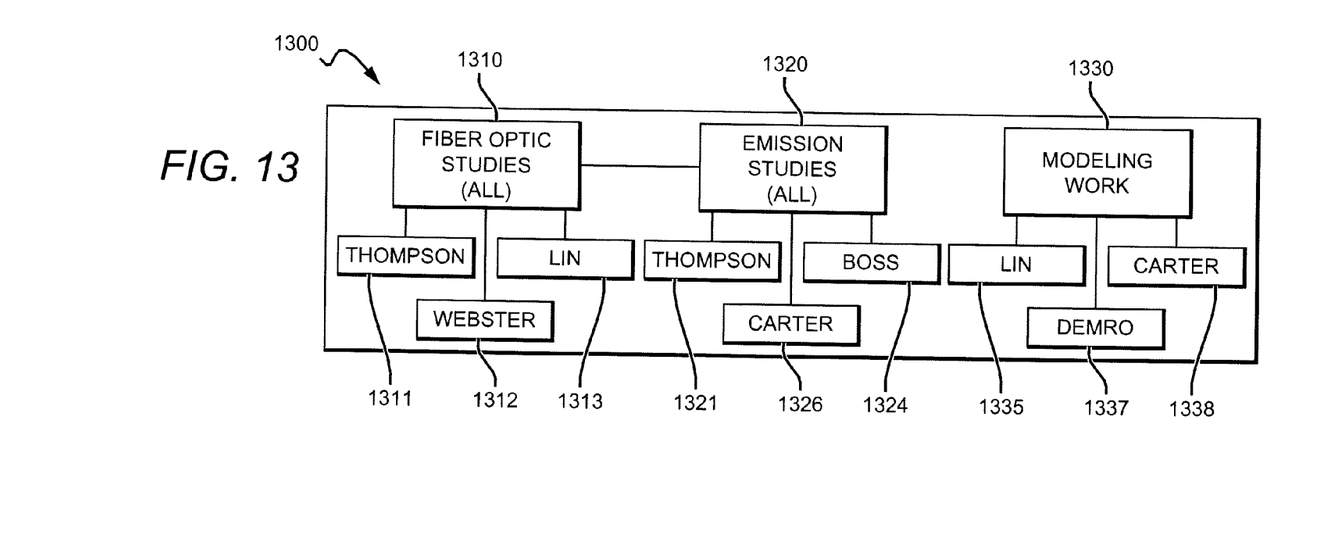
FIG. 13 shows a contemplated updated "individual research projects" tab 1020 from FIG. 10, herein shown as 1300 where additional research has been added to the compilation and intelligently and automatically sorted.

FIG. 13 shows the updated "individual research projects" tab 1020 from FIG. 10, herein shown as 1300 where additional research has been added to the compilation and intelligently and automatically sorted. On this view, the user can navigate through research and data presented by technology (1310, 1320 and 1330) related to the data or by individual (1311, 1312, 1313, 1321, 1324 and 1335 with additional data 1326, 1338 and 1337) who collected and analyzed the data.

Example 5

Electronic Scrapbooking

Scrapbooking, and now electronic scrapbooking, has become enormously popular with families primarily because it gives a person or family an opportunity to capture an event or portion of one's life contemporaneously in a two-dimensional format using pictures, documents and memorabilia. Utilizing a contemplated archiving and compilation platform will allow a person to set up an initial platform for the person or event, easily tag pieces of information by date, event, persons included, or another suitable tag, lay out the information on the platform according to a predetermined logical order of tags—such as date and time, and then incorporate new information as it becomes available without redoing the scrapbook page or pages.

For example, a mother plans a first birthday party for her daughter She invites several people from the neighborhood and gives them all digital cameras to use during the event. She designs original invitations and party favors. In addition, the father uses a video camera to capture the entire day's events in audio and video formats. The mother also takes pictures in digital format. After the event, the mother tags all of her photos and saves them. The father uploads, tags and saves his video. The mother scans the invitations and takes pictures of the party favors, tags them and saves them. She puts all of these different pieces of information on the compilation and archiving platform and indicates that the information should be sorted by date and time of day, which is the predetermined logical order.

Later in the week, several of her friends who were at the party and took pictures E-mail the pictures to her, along with nice notes describing the day from their perspectives and how much fun the event was. The mother tags the photos and the E-mails by date and time. With one click, all of the pieces of information are dropped onto the platform, whereby they are intelligently and automatically sorted onto the appropriate spots on the timeline by the system, thus updating the virtual scrapbook.

Example 6

Examples of Media

Although it should be clear that there are an unlimited number of media—both contemporary and in development—which can be utilized with this type of platform, three are immediately relevant.

First, Blu-Ray™ discs, which are formatted in Java code, can be utilized as a tangible product that consumers can utilize on any hardware capable of running these types of discs. The initial archiving platform with content is stored on the disc and sold to the consumer. When the user engages the content on the disc, the content can be updated by utilizing the platform, if the disc is utilized on a two-way communication device, such as a home computer with an Internet connection. The content and the related platform can also be transferred to the hardware storage device, if available, in order to store the material locally and utilize the content without the discs.

Second, MP3 and iPOD™ devices are being developed with an enormous amount of file space. Compilations can be downloaded onto one of these handheld devices and fully utilized, since many of these devices allow for picture and video content to be accessed, along with high resolution music. When the user "docks" the device, the user will be notified of new content for the compilation. Once the content is accepted and/or purchased by the user, that new content will be sorted and automatically archived into the compilation without any additional work by the user.

Third, an Internet community, such as "Compilation Community" or "ComCom" can be created allowing users/subscribers to have a dedicated webpage where their compilations can be accessed. So, a user may have a Neil Young compilation, a Picasso compilation, a World War II compilation and a personal family history compilation. These four compilations are accessible on the user's webpage. When new content is available to be pushed out to any or all of these compilations, the user is notified and has the opportunity to accept or decline the new content. If the new content is accepted, it's automatically sorted and intelligently archived into the compilation without additional work on the user's part.

Thus, specific embodiments and applications of a sortable and updateable archiving and compilation platform have been disclosed. It should be apparent, however, to those skilled in the art that many more modifications besides those already described are possible without departing from the inventive concepts herein. The inventive subject matter, therefore, is not to be restricted except in the spirit of the disclosure herein. Moreover, in interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

We claim:

1. A method of forming a compilation and archiving platform, comprising:
   receiving by a portable media component via the internet an electronic alert,
      wherein the portable media component includes a computer hard drive, a laptop computer, a hand held device, an iPod, a MP3 player, or a combination thereof,
      wherein the portable media component includes at least one piece of information preloaded on the portable media component, the preloaded piece of information comprising:
         at least first, second, and third different types of data,
            wherein the first, second, and third types of data respectively comprise first, second, and third data files; and
         at least first, second, and third tags;
            wherein the first, second, and third data files are organized in a predetermined logical order in the platform,
            wherein the first data file comprises one or more documents relating to a family's ancestry,
            wherein the second data file comprises high resolution audio relating to the family's ancestry, and
            wherein the third data file comprises video, artwork, still photography, or a combination thereof relating to the family's ancestry,
            wherein the first, second, and third, tags comprise at least first, second, and third identifiers,
            wherein the first identifier comprises date information or time information,
            wherein the second identifier comprises author information or artist information,
            wherein the third identifier comprises subject matter information, and
      wherein the alert informs a user that a new piece of information is available for integration with the preloaded piece of information,
   receiving at the portable media player a user click to accept receipt of the new piece of information from the internet in response to the received alert,
   receiving at least one piece of information received by a portable media component via the internet,
      wherein the received piece of information comprises:
         at least first, second and third different types of data,
            wherein the first, second and third types of data respectively comprise first, second and third data files; and,
         at least first, second and third tags,
            wherein the first, second and third data files are organized in a predetermined logical order in the platform,
            wherein the first data file comprises one or more documents relating to a family's ancestry,
            wherein the second data file comprises high resolution audio relating to a family's ancestry, and
            wherein the third data file comprises video, artwork, still photography or a combination thereof relating to a family's ancestry,
            wherein the first, second and third tags comprise at least first, second and third identifiers,
            wherein the first identifier comprises date information or time information,
            wherein the second identifier comprises author information or artist information,
            wherein the third identifier comprises subject matter information,
      wherein the received pieces of information originate from a member of the family and a member outside of the family,
      wherein the at least one received piece of information is reorganized into another predetermined logical order, and
      wherein the at least one received piece of information is presented as an original compilation laid out in a timeline order based on date, and then is reorganized based on the author information or artist information.

2. The method of claim 1, wherein the at least one received piece of information is introduced to the compilation platform.

3. The method of claim 2, wherein the at least one received piece of information is incorporated into the compilation platform based on the at least one tag.

4. The method of claim 2, wherein the at least one received piece of information is automatically incorporated into the compilation platform based on the at least one tag.

5. The method of claim 1, further comprising reorganizing the at least one preloaded piece of information and the at least one received piece of information into another predetermined logical order.

6. The method of claim 1, further comprising storing the platform in a format.

7. The method of claim 6, wherein the format comprises JAVA code, high resolution format, .NET Framework, Mozilla Prism XUL, XUL Runner, Adobe Air or a combination thereof.

8. A compilation and archiving platform, comprising:
   a portable media component, wherein the portable media component includes a computer hard drive, a laptop computer, a hand held device, an iPod, a MP3 player, or a combination thereof; and
   a first compilation of information comprising:
      at least one piece of information preloaded on the portable media component,
         wherein the preloaded piece of information comprises:
            at least first, second and third different types of data,
               wherein the first, second and third types of data respectively comprise first, second and third data files; and,
            at least first, second and third tags,
               wherein the first, second and third data files are organized in a predetermined logical order in the platform,
               wherein the first data file comprises one or more documents relating to a family's ancestry,
               wherein the second data file comprises high resolution audio relating to the family's ancestry, and
               wherein the third data file comprises video, artwork, still photography or a combination thereof relating to the family's ancestry,
               wherein the first, second and third tags comprise at least first, second and third identifiers, wherein the first identifier comprises date information or time information,
wherein the second identifier comprises author information or artist information,
wherein the third identifier comprises subject matter information, and
at least one piece of information received by the portable media component via the internet,
wherein the received piece of information comprises:
at least first, second and third different types of data,
wherein the first, second and third types of data respectively comprise first, second and third data files; and,
at least first, second and third tags,
wherein the first, second and third data files are organized in a predetermined logical order in the platform,
wherein the first data file comprises one or more documents relating to the family's ancestry,
wherein the second data file comprises high resolution audio relating to the family's ancestry, and
wherein the third data file comprises video, artwork, still photography or a combination thereof relating to the family's ancestry,
wherein the first, second and third tags comprise at least first, second and third identifiers,
wherein the first identifier comprises date information or time information,
wherein the second identifier comprises author information or artist information,
wherein the third identifier comprises subject matter information,
wherein the at least one piece of received information is received by the portable media component via the internet in response to a received electronic alert,
wherein the alert informs a user that the received piece of information is available for integration with the preloaded piece of information,
wherein the user clicks to accept receipt of the received piece of information from the internet in response to the received alert,
wherein received pieces of information originate from a member of the family and a member outside of the family,
wherein the at least one piece of received information is reorganized into another predetermined logical order, and
wherein the at least one piece of received information is presented as an original compilation laid out in a timeline order based on date, and then is reorganized based on the author information or artist information.

9. The compilation platform of claim 8, wherein the predetermined logical order comprises time, date, subject matter, author, producer or a combination thereof.

10. The compilation platform of claim 8, wherein the platform is stored in a format.

11. The compilation platform of claim 10, wherein the format comprises JAVA code, high resolution format, .NET Framework, Mozilla Prism XUL, XUL Runner, Adobe Air or a combination thereof.

12. A non-transitory computer-readable storage medium having instructions stored thereon which, when executed by one or more processors of a system, cause the system to:
receive by a portable media component via the internet an electronic alert,
wherein the portable media component includes a computer hard drive, a laptop computer, a hand held device, an iPod, a MP3 player, or a combination thereof,
wherein the portable media component includes at least one piece of information preloaded on the portable media component, the preloaded piece of information comprising:
at least first, second, and third different types of data,
wherein the first, second, and third types of data respectively comprise first, second, and third data files; and
at least first, second, and third tags;
wherein the first, second, and third data files are organized in a predetermined logical order in the platform,
wherein the first data file comprises one or more documents relating to a family's ancestry,
wherein the second data file comprises high resolution audio relating to the family's ancestry, and
wherein the third data file comprises video, artwork, still photography, or a combination thereof relating to the family's ancestry,
wherein the first, second, and third, tags comprise at least first, second, and third identifiers,
wherein the first identifier comprises date information or time information,
wherein the second identifier comprises author information or artist information,
wherein the third identifier comprises subject matter information, and
wherein the alert informs a user that a new piece of information is available for integration with the preloaded piece of information, receive at the portable media player a user click to accept receipt of the new piece of information from the internet in response to the received alert, and receive at least one piece of information received by a portable media component via the internet,
wherein the received piece of information comprises:
at least first, second and third different types of data,
wherein the first, second and third types of data respectively comprise first, second and third data files; and,
at least first, second and third tags,
wherein the first, second and third data files are organized in a predetermined logical order in the platform,
wherein the first data file comprises one or more documents relating to a family's ancestry,
wherein the second data file comprises high resolution audio relating to a family's ancestry, and
wherein the third data file comprises video, artwork, still photography or a combination thereof relating to a family's ancestry,
wherein the first, second and third tags comprise at least first, second and third identifiers,
wherein the first identifier comprises date information or time information,
wherein the second identifier comprises author information or artist information,
wherein the third identifier comprises subject matter information, wherein the received pieces of information originate from a member of the family and a member outside of the family, wherein the at least one received piece of information is reorganized into another predetermined logical order, and wherein the at least one received piece of information is presented as an original compilation laid out in a timeline order based on date, and then is reorganized based on the author information or artist information.

13. The non-transitory computer-readable storage medium of claim 12, wherein the at least one received piece of information is introduced to the compilation platform.

14. The non-transitory computer-readable storage medium of claim 13, wherein the at least one received piece of information is incorporated into the compilation platform based on the at least one tag.

15. The non-transitory computer-readable storage medium of claim 13, wherein the at least one received piece of information is automatically incorporated into the compilation platform based on the at least one tag.

16. The non-transitory computer-readable storage medium of claim 12, further comprising reorganizing the at least one preloaded piece of information and the at least one received piece of information into another predetermined logical order.

17. The method of claim 12, further comprising storing the platform in a format.

18. The method of claim 17, wherein the format comprises JAVA code, high resolution format, .NET Framework, Mozilla Prism XUL, XUL Runner, Adobe Air or a combination thereof.

* * * * *